Feb. 17, 1959 C. D. KEITH 2,874,130
PROCESS FOR PREPARING ALUMINA TRIHYDRATE
Filed March 29, 1955 2 Sheets-Sheet 1

INVENTOR
CARL D. KEITH
BY
Adams, Forward and McLean
ATTORNEYS

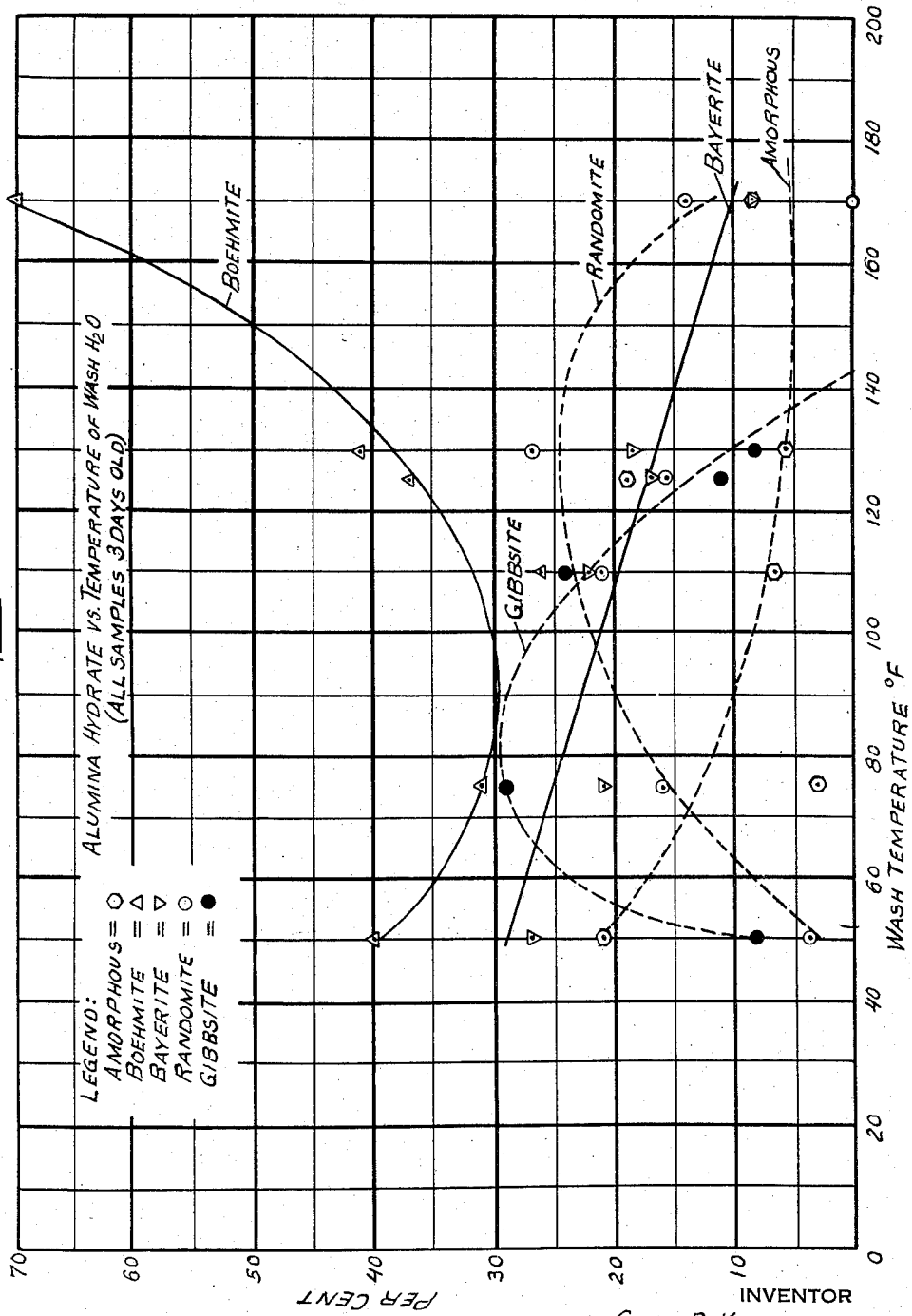

United States Patent Office

2,874,130
Patented Feb. 17, 1959

2,874,130

PROCESS FOR PREPARING ALUMINA TRIHYDRATE

Carl D. Keith, Munster, Ind., assignor to Engelhard Industries, Inc., a corporation of New Jersey Application March 29, 1955, Serial No. 497,725

13 Claims. (Cl. 252—466)

My invention relates to the production of alumina hydrate compositions of value as precursor base compositions in the manufacture of calcined alumina base catalysts. These hydrate compositions have particular utility as base compositions for calcined alumina catalysts containing a platinum metal having hydrocarbon conversion activity.

In the hydrocarbon conversion field, platinum-alumina catalysts have become commercially important in catalytic reforming operations designed to convert virgin naphthas of low octane to high octane gasoline stocks and to produce aromatics from selected gasoline fractions. A number of factors are significant in development of platinum-alumina catalysts of activity and selectivity suitable for commercial utilization. Because of the high cost of platinum-containing catalysts, long catalyst life, measured by a low rate of activity decline, is even more important than high initial or virgin activity. A critical factor in determining catalyst life as well as activity and selectivity is the nature of the alumina base. It has been found, as described in application Serial No. 288,058, filed May 15, 1952, and now abandoned, by John W. Teter, John L. Gring and Carl D. Keith, and in its continuation-in-part application Serial No. 489,726, filed February 21, 1955, that a catalyst having a calcined alumina base produced from a mixture of precursor hydrous alumina phases containing from about 65 to about 95 weight percent alumina trihydrate possesses a number of significant advantages in use as a reforming catalyst or a catalyst for production of aromatics. The finished catalyst has a base structure characterized by large pore volume, e. g. greater than about 0.1 cc. per gram of its pore volume in pores of more than 100 angstrom units in size; high surface area, e. g. about 350 to about 550 square meters per gram, when the precursor alumina hydrate composition is dried and calcined; and it contains about 0.1 to about 1.0% by weight of a platinum metal present in sufficiently finely distributed form as to exhibit by X-ray diffraction analysis the substantial absence of crystallites greater in size than about 50 angstrom units. The resulting catalysts have high activity including unusually high dehydrocyclization activity, low rates of activity decline and can be regenerated by oxidative means.

As described in the above applications the alumina precursor composition is produced from an alumina hydrogel which may be formed by precipitating gelatinous hydrous alumina from a solution of a soluble aluminum salt such as aluminum chloride by means of ammonium hydroxide. Aqueous ammonium hydroxide can be added to the aluminum chloride solution until a pH of about 8 has been reached while stirring the mixture vigorously. Following the precipitation, the precipitate is separated and washed with water in order to reduce the concentration of contaminating ions, e. g. chloride ion in the case of ammonium chloride, to a low limit usually less than about 0.2 weight percent. The washed precipitate then is converted, usually by aging as long as necessary, or by seeding, from the predominantly amorphous state as freshly precipitated to a mixture predominating in the crystalline trihydrate forms of alumina. The trihydrate phase contains forms as determined by X-ray diffraction analysis of dried samples corresponding to gibbsite, bayerite and a new form of alumina trihydrate which appears to be intermediate gibbsite and bayerite in crystalline structure which gives a line at 4.79 A. by X-ray diffraction (Cu radiation) and which has been termed randomite. The precursor base also contains about 5 to about 35 weight percent of other hydrous aluminas in the form of alumina monohydrate, e. g. boehmite, as detected by X-ray analysis after drying or in the form of amorphous hydrous alumina or mixtures of these forms.

The precious metal component, rhodium, palladium, iridium, or most advantageously platinum, may be incorporated through mixing the alumina component with the desired amount of precious metal component in the form of a soluble or colloidally dispersible compound. For example, chloroplatinic acid may be added to the slurry and precipitated by introduction of hydrogen sulfide in aqueous solution. Alternatively, the platinum may be introduced in the form of a sulfide sol. The catalyst composition is finished by drying the hydrate slurry, advantageously under controlled conditions, e. g. for about 24 hours at 110 to 120° C. and at a pH of about 6 to about 9. The dried composition then may be formed into tablets or pills or may be rewetted and extruded to particles of desired size. The resulting catalyst particles can be calcined by heating to about 800° to about 1200° F. for a period of about 3 to about 12 hours in an atmosphere of a flowing oxygen-containing gas. Before use, the catalyst can be reduced by subjecting it to flowing hydrogen at about 800° to about 1100° F. for a period up to several hours.

An essential step, therefore, in the preparation of alumina-platinum metal catalysts of this type is the conversion of the amorphous hydrous alumina or alumina hydrogel, to a crystalline or quasi crystalline alumina trihydrate phase. It has been found that bayerite appears to exist in the catalyst precursor as crystallites larger in size than those of gibbsite or randomite. Precursor mixtures of trihydrates containing substantial proportions of randomite and gibbsite are characterized by smaller crystallite sizes as determined by X-ray diffraction, and such mixtures can be employed in the catalyst preparation to afford catalysts of good performance characteristics and to provide process control and uniform product in any commercial operation.

I have discovered in the present invention that platinum metal reforming catalysts of high activity combined with excellent life and regenerability can be prepared from trihydrate compositions produced by aging freshly precipitated amorphous alumina hydrogels when the aging process is initiated under controlled conditions. After the hydrogel is precipitated as through the addition of ammonium hydroxide to an aqueous aluminum chloride solution, conversion of the amorphous hydrogel to trihydrate will not take place to a substantial degree apparently because of the presence of contaminating salts such as ammonium chloride. As the hydrogel is washed conversion to the trihydrate proceeds as the hydrate is washed free of substantially all contaminating water-soluble salts. I have found that the ultimate composition of the trihydrate in terms of relative amounts present of bayerite, gibbsite and randomite, is dependent upon the temperature of initial trihydrate crystallite formation. Thus as the initial crystallites are formed during washing the temperature of the alumina hydrate can be controlled by the temperature of the wash water to afford desirable hydrate precursors containing varying amounts of gibbsite, randomite, and bayerite.

I have found that the use of the warm water in washing tends to minimize formation of the bayerite trihydrate form as maximum bayerite yield is obtained at temperatures less than about 60° F. To obtain increased amounts of gibbsite and randomite and decreased amounts of bayerite in the catalyst precursors I conduct the washing operation at temperatures of about 75° to about 160° F. or somewhat higher. These temperatures in addition to affording the desired composition produce through aging, precursor compositions of about 65 to about 95% trihydrate. Above about 140° F. there is a rapid fall-off in the rate of trihydrate conversion, so preferably I do not wash at a higher temperature. The washing is advantageously conducted at about 80 to about 100° F. when considering the combined factors of rate of hydrate formation, composition of the resulting aged hydrate and economics of water temperature. At temperatures of about 75 to about 110° F. the ultimate or total amount of the trihydrate phases in the aged composition appears to be about equal, and the rate of trihydrate formation during washing is at a maximum. The yield of gibbsite passes through a maximum when the wash temperature is within the range from about 75° to about 95° F. If the preferential formation of randomite is desired, while minimizing bayerite formation, the washing is conducted at temperatures from about 110° F. to about 140° F. To obtain a trihydrate phase predominating in bayerite a wash temperature of less than about 60° F. and preferably about 40 to about 60° F. should be employed.

In practicing the invention, the pH in the washing step is advantageously maintained within the range of 7 to about 10 if hydrate conversion at a practicable rate and to a desirable extent be obtained. The pH can be adjusted as by the addition of small amounts of aqueous ammonium hydroxide to the wash water preferably until the pH is at least about 8. If the pH be above about 9.5 at the conclusion of washing, the trihydrate composition may be depreciated in quality for reforming catalyst purposes since platinum-alumina catalysts made from it seem to contain the platinum in the form of undesirably large crystallites. In the practice of the invention, any period of aging subsequent to the washing operation which is necessary to obtain the 65 to 95% trihydrate composition is advantageously conducted by maintaining the hydrate undergoing aging at a pH of 7 to about 9. The temperature of any subsequent aging period, however, need not be maintained at the particular level employed in washing since test results indicate that increase in trihydrate concentration proceeds by a seeding process. The initial concentrations of the trihydrate phases established by the temperature and pH control conditions of the washing operation then primarily determine the final composition of the trihydrate mixture. A temperature, however, substantially below 70° F. or a temperature substantially above 170° F. during aging subsequent to washing should be avoided because transformation of amorphous and monohydrate alumina to crystalline trihydrate may be inhibited or partial reversion to boehmite may result. The employment of wash temperatures of about 75 to about 160° F. also affords the desired trihydrate in relatively short aging times particularly when the portion of the aging period after washing is conducted at about 70 to 170° F. with higher temperatures increasing the rate of aging.

The water employed in the washing operation should be carefully purified, for example, by distillation or deionization since purity of the hydrate precursor composition and of the remaining catalyst components is an important factor in obtaining useful catalysts. In particular, the use of starting process materials containing iron should be avoided.

As noted above, the initial alumina hydrogel may be formed by precipitation from aluminum chloride or other soluble acidic aluminum salts, e. g. the strongly acidic salts, aluminum sulfate or aluminum nitrate, through addition of a suitable neutralizing base. Temperature control can be observed in the precipitation if desired, for instance, the hydrogel can be precipitated at a temperature within the range of about 70 to about 160° F.

The figures of the drawings illustrate graphically the effect of alumina temperature during washing on the ultimate hydrate compositions. The data were obtained by the procedure of the following preparation which also provides an example of a specific procedure although the invention is not limited to it.

A series of preparations were made by the following procedure; in general, the only variable was temperature.

While vigorously stirring the aluminum chloride solution (15 pounds of aluminum chloride hexahydrate per 30 liters of deionized water) a solution of ammonium hydroxide (1 volume of concentrated ammonium hydroxide (27 to 30% $NH_3$) plus 1 volume of deionized water), was continuously added (by syphon) at a constant rate until the pH was 8.0. The initial solutions were at about 80° F. and the rate of $NH_4OH$ addition was set so that the precipitation would be completed in about 30 minutes. When the pH of the precipitating mixture was about 5, the mixture thickened up and $NH_4OH$ addition was discontinued until stirring was efficient. The precipitate was stirred 30–45 minutes and filtered from the mother liquor in a plate and frame press. The cake was washed overnight in the press with flowing deionized water at a series of temperatures providing the data for the graph of the drawing. The partially washed cake was reslurried in deionized water (5 gallons of water used per pound of $Al_2O_3$) at washing temperature, the pH was adjusted to about 9.0 by adding ammonium hydroxide and the slurry was stirred for approximately 1 hour. The hydrate was filtered from the wash liquor and washed overnight in the filter press with deionized water at the selected temperature. The cake was reslurried at pH=9.0, filtered, and washed in the press as above, to reduce chloride content to less than about 0.2%. The washed cake in each case was aged at the indicated washing temperature. All samples were examined three days after precipitation by X-ray diffraction analysis after drying at 120° C.; the figures are plots of these data.

Figure 2 shows how hydrate composition varies with wash water temperature.

Figure 1:
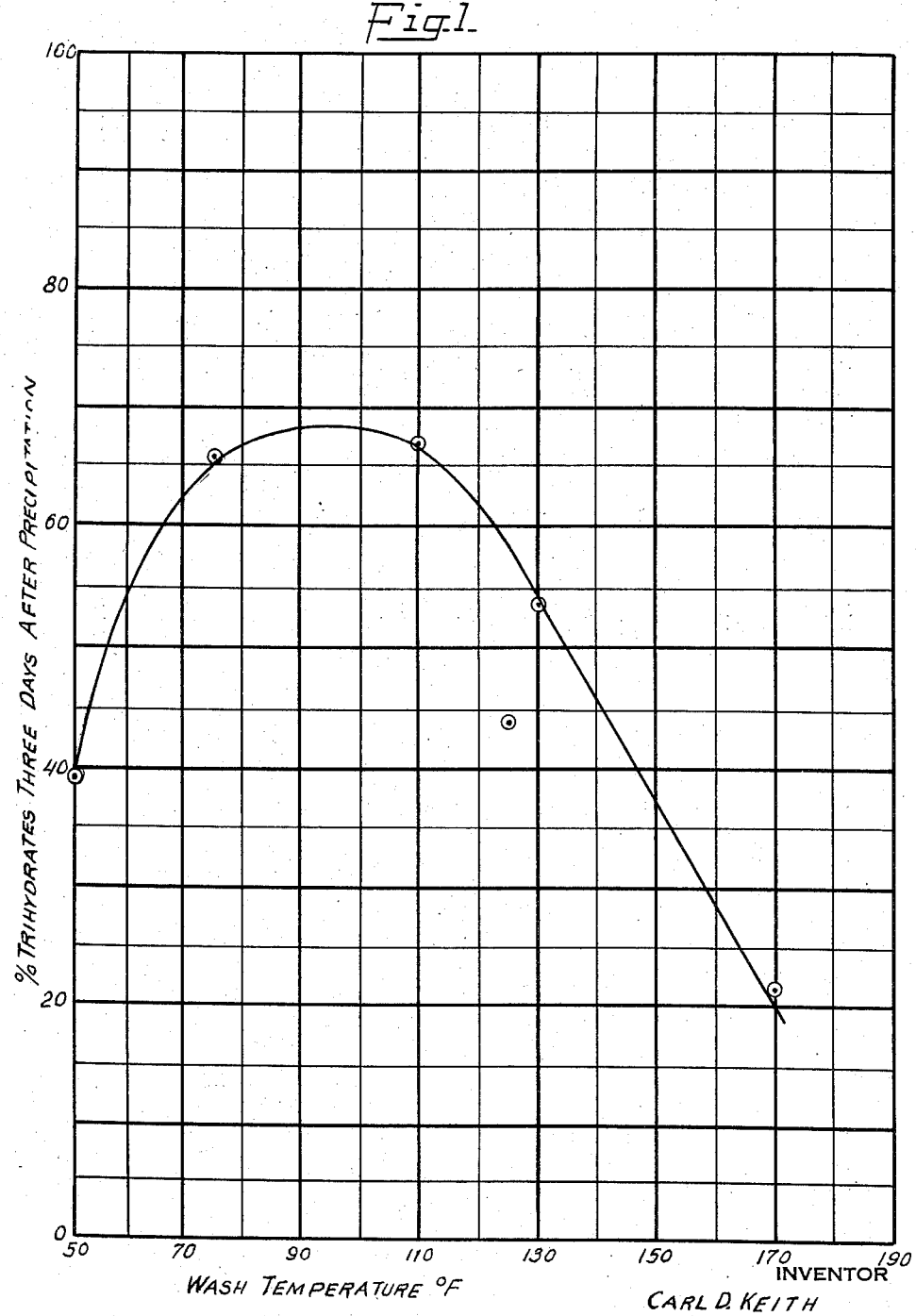
Figure 1 shows that rate of trihydrate formation goes through a maximum at about 75 to about 110° F.

The following conclusions can be made from Figure 2:

(1) Amorphous hydrate generally decreases with increasing temperature.

(2) Boehmite concentration goes through a minimum at about 90° F. and rapidly increases at high temperatures.

(3) Bayerite concentration decreases with increasing temperature.

(4) Randomite concentration goes through a maximum at about 130° F.

(5) Gibbsite concentration goes through a maximum at about 80° F.

It will be appreciated that Figure 2 is not an indication of the total hydrate content obtainable by aging as the sample had aged only 3 days from precipitation with washing being conducted during this period. When the same base hydrates are aged to higher trihydrate concentrations it is found that the curve for a given trihydrate is very similar for the young and aged hydrates.

Preparation of a platinum metal-containing alumina catalyst is illustrated by the following procedure: Two liters of alumina hydrate slurry containing 123 grams of alumina per liter is placed in a three-gallon stoneware jar and stirred vigorously for about thirty minutes to effect thorough dispersion. With continued stirring a platinum solution consisting of 34.4 ml. of chloroplatinic acid solution (0.043 gram Pt/ml.) plus 170 ml. of deionized water is added over a five-minute period. After ten minutes additional stirring, hydrogen sulfide (343 ml. of deionized water saturated with $H_2S$ at 78° F.) is added slowly. The slurry is stirred an additional thirty minutes prior to drying. The resulting slurry usually is then in viscosity and light brown in color.

The slurry is poured into a pyrex tray and placed in an Aminco (forced air) oven at 110° C. The drying is conducted at a rate assuring uniformity, and if surface films or discontinuities form, the slurry is redispersed until homogeneous by vigorous agitation. The dry catalyst is ground to pass 20 mesh, is mixed with 2 percent Sterotex (an organic die lubricant) and formed as 5/32" x 5/32" tablets. The Sterotex is burned out at 900° F. using five parts air plus three hundred parts nitrogen atmosphere.

The oxygen content is then slowly increased, and finally, the catalyst is calcined for six hours at 900° F. in straight air. Before use, the catalyst is treated with flowing hydrogen at 900° F. for six hours.

Except for X-ray diffraction data unless otherwise indicated when specifying percentages of components of the catalyst composition and of alumina hydrate, I refer to weight percent on an ignited basis. Also, surface area as mentioned above is calculated on an ignited weight basis.

I claim:

1. In the production of alumina trihydrate compositions by a process comprising formation of an amorphous alumina hydrogel, washing the hydrogel with water until substantially free of contaminating ions, and converting the amorphous hydrogel to an alumina hydrate composition containing about 65% to about 95% of crystalline trihydrate, the method of hydrate conversion which comprises washing the alumina hydrogel with water at a temperature in the range defined by temperatures less than about 60° F. and from about 75° to about 160° F. to control the relative amounts of bayerite, gibbsite and randomite in the converted trihydrate composition.

2. The method of claim 1 in which the wash temperature is from about 40 to about 60° F.

3. The method of claim 1 in which the amorphous alumina hydrogel is formed by addition of a neutralizing base to an aqueous solution of an acidic aluminum salt.

4. In the production of alumina trihydrate compositions by a process comprising formation of an amorphous alumina hydrogel, washing the hydrogel with water until substantially free of contaminating ions and converting the amorphous hydrogel to an alumina hydrate composition containing about 65 to about 95% of crystalline trihydrate, the method of hydrate conversion which comprises washing the alumina hydrogel with water at a temperature from about 75 to about 160° F. to control the relative amounts of bayerite, gibbsite and randomite in the converted hydrate composition.

5. The method of claim 4 in which the pH of the washing step is maintained from about 8 to about 10 by addition of aqueous ammonium hydroxide to the wash water.

6. The method of claim 4 in which the amorphous alumina hydrogel is formed by addition of a neutralizing base to an aqueous solution of an acidic aluminum salt.

7. The method of claim 4 in which the wash temperature is from about 75 to about 95° F.

8. The method of claim 4 in which the wash temperature is from about 110° to about 140° F.

9. The method of claim 7 in which the amorphous alumina hydrogel is formed by addition of a neutralizing base to an aqueous solution of an acidic aluminum salt.

10. The method of claim 8 in which the amorphous alumina hydrogel is formed by addition of a neutralizing base to an aqueous solution of an acidic aluminum salt.

11. In the production of an alumina base platinum metal catalyst by formation of an amorphous alumina hydrogel, washing the hydrogel substantially free of contaminating ions with water and converting the hydrogel to an alumina hydrate composition predominating in a mixture of alumina trihydrate phases, incorporation of a platinum metal in finely distributed form, drying and calcining, the method of hydrate conversion which comprises washing the alumina hydrogel with water at a temperature from about 75 to about 160° F. and aging the hydrogel to obtain a mixture of crystalline trihydrates amounting to 65% to 95% of the hydrate composition.

12. The method of claim 11 in which the pH of the washing step is maintained from about 8 to about 10 by addition of aqueous ammonium hydroxide to the wash water.

13. The method of claim 12 in which the amorphous alumina hydrogel is formed by addition of a neutralizing base to an aqueous solution of an acidic aluminum salt.

References Cited in the file of this patent

UNITED STATES PATENTS

| | | |
|---|---|---|
| 2,499,675 | Owen | Mar. 7, 1950 |
| 2,611,736 | Haensel | Sept. 23, 1952 |
| 2,636,865 | Kimberlin | Apr. 28, 1953 |
| 2,663,620 | Haensel | Dec. 22, 1953 |
| 2,689,226 | Hoekstra | Sept. 14, 1954 |